United States Patent
Mi et al.

(10) Patent No.: US 6,997,595 B2
(45) Date of Patent: Feb. 14, 2006

(54) BRIGHTNESS ENHANCEMENT ARTICLE HAVING TRAPEZOIDAL PRISM SURFACE

(75) Inventors: Xiang-Dong Mi, Rochester, NY (US); David Kessler, Rochester, NY (US); Janet Donner, West Henrietta, NY (US)

(73) Assignee: Eastman Kodak Company, Rochester, NY (US)

( * ) Notice: Subject to any disclaimer, the term of this patent is extended or adjusted under 35 U.S.C. 154(b) by 62 days.

(21) Appl. No.: 10/642,711

(22) Filed: Aug. 18, 2003

(65) Prior Publication Data

US 2005/0041311 A1 Feb. 24, 2005

(51) Int. Cl.
 *F21V 5/02* (2006.01)
(52) U.S. Cl. ............... 362/626; 362/558; 385/129; 359/834; 349/64
(58) Field of Classification Search ............... 362/31, 362/558, 561, 311, 330, 339, 551, 559, 560, 362/257, 317, 326, 333, 626; 385/129; 359/707, 359/599, 642, 831, 833, 834, 837; 349/64, 349/62, 61, 56, 112
See application file for complete search history.

(56) References Cited

U.S. PATENT DOCUMENTS

| | | | |
|---|---|---|---|
| 3,129,895 A * | 4/1964 | Franck | 362/330 |
| 4,368,504 A * | 1/1983 | Sato et al. | 362/33 |
| 5,396,350 A | 3/1995 | Beeson et al. | |
| 5,839,823 A | 11/1998 | Hou et al. | |
| 5,917,664 A | 6/1999 | O'Neill et al. | |
| 5,944,405 A | 8/1999 | Takeuchi et al. | |
| 6,049,649 A * | 4/2000 | Arai | 349/62 |
| 6,494,588 B1 * | 12/2002 | Okada | 362/31 |
| 6,502,947 B1 * | 1/2003 | Matsumoto et al. | 362/31 |
| 6,570,710 B1 * | 5/2003 | Nilsen et al. | 359/625 |
| 6,669,350 B1 * | 12/2003 | Yamashita et al. | 362/31 |
| 6,693,690 B1 * | 2/2004 | Umemoto et al. | 349/62 |
| 6,700,716 B1 * | 3/2004 | Sejkora | 359/834 |

FOREIGN PATENT DOCUMENTS

| EP | 0 588 504 | 3/1994 |
|---|---|---|
| EP | 0 785 458 | 7/1997 |

* cited by examiner

*Primary Examiner*—Thomas M. Sember
*Assistant Examiner*—Ismael Negron
(74) *Attorney, Agent, or Firm*—Arthur E. Kluegel

(57) ABSTRACT

A brightness enhancement article for improving luminance from a light source includes a light-collecting prism surface forms a series of longitudinal trapezoidal prism elements in which each has a face plane disposed toward the light source and first and second legs extending back from the face plane, forming first and second base angles$\beta$ with the face plane wherein both first and second base angles$\beta$ satisfy: 90 degrees<base angle $\beta$<120 degrees.

25 Claims, 11 Drawing Sheets

BRIGHTNESS ENHANCEMENT ARTICLE HAVING TRAPEZOIDAL PRISM SURFACE

FIELD OF THE INVENTION

The invention generally relates to brightness enhancement articles and more particularly relates to a brightness enhancement article for use with backlit display devices, such as laptop LCD displays.

BACKGROUND OF THE INVENTION

LCD displays offer a compact, lightweight alternative to CRT monitors. In spite of their advantages, however, LCD displays are limited in brightness, or, more properly, in luminance, particularly when viewed from an off-axis angle, where the optical axis is generally normal to the LCD display surface. When viewed straight-on, along the optical axis, an LCD display may have sufficient luminance for most laptop computer applications. However, as the angle of the viewer increases with respect to the optical axis, luminance diminishes quickly.

The transmissive LCD used in conventional laptop computer displays is a type of backlit display, having a light providing surface positioned behind the LCD for directing light outwards, towards the LCD. The light-providing surface itself provides illumination that is essentially Lambertian, that is, having an essentially constant luminance from a broad range of angles. With the goal of increasing on-axis and near-axis luminance, a number of brightness enhancement films have been proposed for redirecting a portion of this light having Lambertian distribution. Among proposed solutions for brightness or luminance enhancement for use with LCD displays and with other types of backlit display types are the following:

U.S. Pat. No. 5,592,332 (Nishio et al.) discloses the use of two crossed lenticular lens surfaces for adjusting the angular range of light in an LCD display apparatus;

U.S. Pat. No. 5,611,611 (Ogino et al.) discloses a rear projection display using a combination of Fresnel and lenticular lens sheets for obtaining the desired light divergence and luminance;

U.S. Pat. No. 6,111,696 (Allen et al.) discloses a brightness enhancement article for a display or lighting fixture. With the optical film disclosed in the '696 patent, the surface facing the illumination source is smooth; the opposite surface has a series of structures, such as triangular prisms, for redirecting the illumination angle. The film disclosed in the '696 patent refracts off-axis light to provide a degree of correction for directing light at narrower angles. However, this film design works best for redirecting off-axis light; incident light that is normal to the film surface may be reflected back toward the source, rather than transmitted;

U.S. Pat. No. 5,629,784 (Abileah et al.) discloses various embodiments in which a prism sheet is employed for enhancing brightness, contrast ratio, and color uniformity of an LCD display of the reflective type. In an embodiment disclosed in the '784 patent, the brightness enhancement film similar to that of the '696 patent is arranged with its structured surface facing the source of reflected light for providing improved luminance as well as reduced ambient light effects. Because this component is used with a reflective imaging device, the prism sheet of the '784 disclosure is placed between the viewer and the LCD surface, rather than in the position used for transmissive LCD systems (that is, between the light source and the LCD);

U.S. Patent Application Publication No. 2001/0053075 (Parker et al.) discloses various types of surface structures used in light redirection films for LCD displays, including prisms and other structures;

U.S. Pat. No. 5,887,964 (Higuchi et al.) discloses a transparent prism sheet having extended prism elements along each surface for improved back-light propagation and luminance in an LCD display. As is noted with respect to the '696 patent mentioned above, much of the on-axis light is reflected rather than transmitted with this arrangement. Relative to the light source, the orientation of the prism sheet in the '964 disclosure is reversed from that used in the '696 disclosure. It must be emphasized that the arrangement shown in the '964 disclosure is usable only for small, hand-held displays and does not use a Lambertian light source;

U.S. Pat. No. 6,356,391 (Gardiner et al.) discloses a pair of optical turning films for redirecting light in an LCD display, using an array of prisms, where the prisms can have different dimensions;

U.S. Pat. No. 6,280,063 (Fong et al.) discloses a brightness enhancement film with prism elements on one side of the film having blunted or rounded peaks;

U.S. Pat. No. 6,277,471 (Tang) discloses a brightness enhancement film having a plurality of generally triangular prism elements having curved facets;

U.S. Pat. No. 5,917,664 (O'Neill et al.) discloses a brightness enhancement film having "soft" cutoff angles in comparison with conventional film types, thereby mitigating the luminance change as viewing angle increases; and U.S. Pat. No. 5,839,823 (Hou et al.) and U.S. Pat. No. 5,396,350 (Beeson et al.) disclose back-coupled illumination systems with light recycling features, including various prismatic structures such as trapezoidal prisms mounted against a transparent base wall. Directed to light redirection in illumination apparatus where heat may be a problem, the solutions described in the Hou '823 and Beeson '350 disclosures employ non-Lambertian light sources with reflectors and provide an output that is not highly uniform.

FIG. 1 shows one type of prior art solution, a brightness enhancement article 10 for enhancing light provided from a light source 18. Brightness enhancement article 10 has a smooth side 12 facing towards a light providing surface 14, which contains a reflective surface 19, and rows of prismatic structures 16 facing an LCD component 20. This arrangement, as described in U.S. Pat. Nos. 6,111,696 and 5,629,784 (both listed above), and in U.S. Pat. No. 5,944,405 (Takeuchi et al.), generally works well, improving the on-axis luminance by refraction of off-axis light rays and directing this light closer to the normal optical axis. As FIG. 1 shows, off-axis rays R1 are refracted toward normal. It is instructive to note, however, that, due to total internal reflection (TIR), near-axis light ray R3 can be refracted away from normal at a more extreme angle. In addition, on-axis light ray R4 can actually be reflected back toward light-providing surface 14 for diffusion and reflection from reflective surface 19 rather than directed toward LCD component 20. This refraction of near-axis light and reflection of at least a portion of on-axis light back into light providing surface 14 acts to adjust illumination luminance with respect to viewing angle, as is described subsequently. By the action of light-providing surface 14 and reflective surface 19, a portion of the light that is reflected back from brightness enhancement article 10 is eventually diffused and again directed outward toward the LCD component at a generally normal angle.

The purpose of brightness enhancement article 10, then, is to redirect the light that is provided over a large angular range from light providing surface 14, so that the output light it provides to LCD component 20 is more narrowly directed toward normal. By doing this, brightness enhancement article 10 helps to improve display luminance not only when viewed straight-on, at a normal to the display surface, but also when viewed from oblique angles.

As the viewer angle from normal increases, the perceived luminance can diminish significantly beyond a threshold angle. The graph of FIG. 2 shows a luminance curve 26 that depicts the characteristic relationship of luminance to viewer angle when using the prior art brightness enhancement article 10. As expected, luminance peaks at the normal and decreases toward a threshold cutoff angle θcutoff each side of normal. A slight increase occurs after angle θcutoff; however, this effect is wasted light, not readily perceptible to the viewer due to characteristics of the LCD display itself.

With reference to luminance curve 26 in FIG. 2, there are a number of characteristics of particular interest for brightness enhancement components. One characteristic is the overall shape of the curve. The luminance over a range of viewing angles is proportional to the area under the curve for those angles. Typically, the peak luminance values occur at angles near normal, as would be expected. In order to obtain an improved range of view angles, a brightness enhancement article redistributes light, changing the shape of its respective luminance curve 26 accordingly. Another characteristic of interest relates to cutoff angles θcutoff. At angles beyond θcutoff, luminance will be significantly diminished. Light provided at angles beyond θcutoff is essentially wasted. Thus, it can be seen that there would be advantages to design techniques that allow some measure of control over peak luminance levels, θcutoff, and the overall shape of luminance curve 26. With the characteristic behavior of FIG. 2 in mind, the disclosure of U.S. Pat. No. 5,917,664 describes a brightness enhancement article that provides a "softer" cutoff characteristic, using prism structures of varying dimensions. The method of the '664 patent uses a complex arrangement of different surface prism structures to changes the shape of the brightness response curve accordingly, so that greater luminance is available at off-axis angles.

While the approach of the '664 disclosure provides some improvement of off-axis luminance, there are additional considerations that suggest the need for further modification of the brightness response curve for achieving improved off-axis luminance. Referring to FIG. 3, there are shown two light rays directed through LCD component 20: ray R5 at normal incidence N and ray R6 at an oblique angle Q. It has been observed that even though the light being provided along both rays R5 and R6 may have equal intensity at the source, the perceived brightness through LCD component 20 is diminished at oblique angle Q, due to characteristics of LCD structures. As a comparative range of values, for example, where light from ray R5, at normal incidence N to the surface of LCD component 20, has a normalized intensity of 1.0, light from ray R6 at oblique angle Q of 20 degrees from normal can have a relative normalized intensity of about 0.8. In effect, this LCD characteristic acts to at least partially offset increased light intensity provided by smoothing the brightness response curve. Thus, even when light can be provided over a broadened range of angles, LCD characteristics themselves constrain the luminance levels available at oblique viewing angles.

While conventional approaches, such as those noted in the prior art disclosures mentioned hereinabove, provide some measure of brightness enhancement, these approaches have some shortcomings. One salient drawback of prior art approaches relates to the difficulty of predicting light behavior and how it may be modified. That is, while an existing design may work, conventional methods do not appear to provide tools for sufficient control over factors such as the overall shape of luminance curves 26 and the value of cutoff angles θcutoff. Certainly, the effects of changes to shapes and dimensions of surface structures can be assessed empirically once a film is fabricated. However, trial-and-error design methods can be less than satisfactory for design of a brightness enhancement article that would serve well in a specific application and such methods can be costly for developing prototype films for this purpose.

As disclosed in the patents listed above, brightness enhancement articles have been proposed with various types of refractive surface structures, including arrangements employing a plurality of triangular prisms, both as matrices of separate prism structures and as elongated prism structures, with the apex of these prisms both facing toward and facing away from the light source. In a broader context, these and other types of surface structures have been proposed with LCDs for specialized purposes other than for luminance enhancement. For example, in an article entitled "P-29: Design of the Viewing-Angle-Controlling Film for LCD", in *SID 00 Digest*, authors Li, Zhang, Zhang, and Zhang propose the use of a combination comprising both trapezoidal and ellipsoidal prism structures external to the LCD and facing away from the light source for controlling the viewing angle of the display. Authors Li et al. describe how manipulating dimensions of these prism structures enables optimization to suit applications which require an LC display at specific viewing angles within ±20 to ±90 degrees. Unlike brightness enhancement articles, however, the prismatic cell array of the Li et al. disclosure is designed to improve optical characteristics such as display color and contrast within the viewing angle range, rather than to redirect light for improved luminance.

In spite of the concerted effort that has been expended for improving display luminance, there is still room for improvement. LCD display equipment still requires multiple layers of films for enhancing brightness and improving contrast, adding complexity and bulk to display packaging. In contrast to prior art techniques that use complex structures to modify luminance curve shape and cutoff angles, simplified techniques for more accurate control of curve characteristics and cutoff angles would be advantageous. Thus, it can be seen that there is a need for a brightness enhancement article that is light-efficient and allows a measure of control of luminance characteristics including cutoff angle.

SUMMARY OF THE INVENTION

It is an object of the present invention to provide a brightness enhancement article that allows improved control of luminance characteristics and provides improved display visibility at either on-axis or off-axis viewing angles. With this object in mind, the present invention provides a brightness enhancement article for transmitting incoming light and preferentially redirecting the light in a viewing direction, comprising a prism surface for receiving the light comprising a series of spaced-apart prism elements having a substantially trapezoidal cross-section, each said trapezoidal prism element comprising:

(a) a face plane disposed toward the incoming light;

(b) a base plane larger than the face plane, disposed away from the incoming light, connecting the base of the prism elements; and (c) first and second non-parallel planes extending back from said face plane to said base plane, each forming an angle (β), within the prism element between the non-parallel plane and said face plane, of greater than 90 and less than 120 degrees.

It also provides an improved display device and method of enhancing brightness. Use of the invention enables better light distribution for viewing purposes.

It is a feature of the present invention that it provides a brightness enhancement article having elongated trapezoidal prism elements or matrices of trapezoidal prism elements for guiding off-axis light through a display to provide favorable luminance.

It is an advantage of the present invention that it provides an efficient medium for luminance enhancement, allowing on-axis light to be transmitted without reflection and directing off-axis light toward normal.

It is a further advantage of the present invention that it provides a straightforward method for controlling the cutoff angle of incident light. The enhancement article of the present invention is thereby advantaged over prior art film types, allowing film design parameters to be modified with some measure of predictability for light handling characteristics.

It is yet a further advantage of the present invention that it provides a brightness enhancement article solution that can be easily manufactured.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

It is instructive to note that brightness enhancement is achieved by conditioning incident light from a light providing surface or other light source to redirect at least a portion of the incident light by refraction. In any particular embodiment, the goal of brightness enhancement depends largely on the application. For some types of display devices, redirection of light toward normal is the preferred type of conditioning needed. In yet other cases, redistribution of light over a broader range of viewing angles is the preferred type of conditioning needed. The apparatus and method of the present invention provide a flexible mechanism for conditioning luminance characteristics in a number of ways to provide brightness enhancement over a range of applications.

Figure 4A:
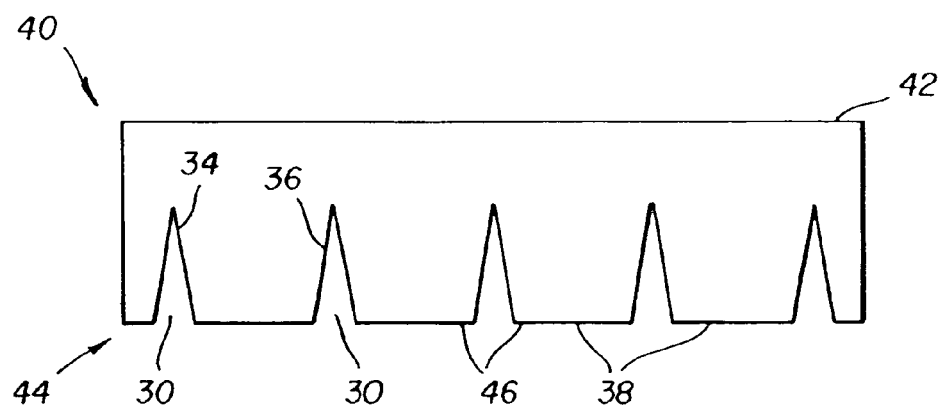
FIGS. 4a–4h are cross-sectional side views showing structural components, geometric relationships, and light-handling behavior for a brightness enhancement article of the present invention.
Figure 4B:
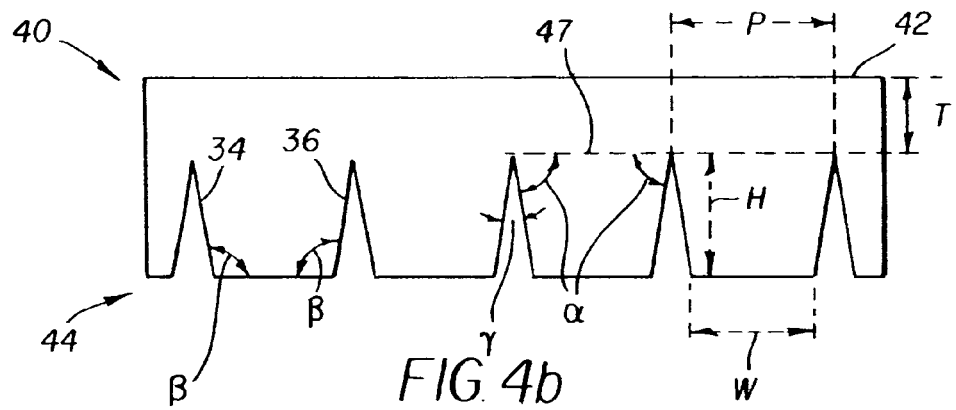
Figure 4C:
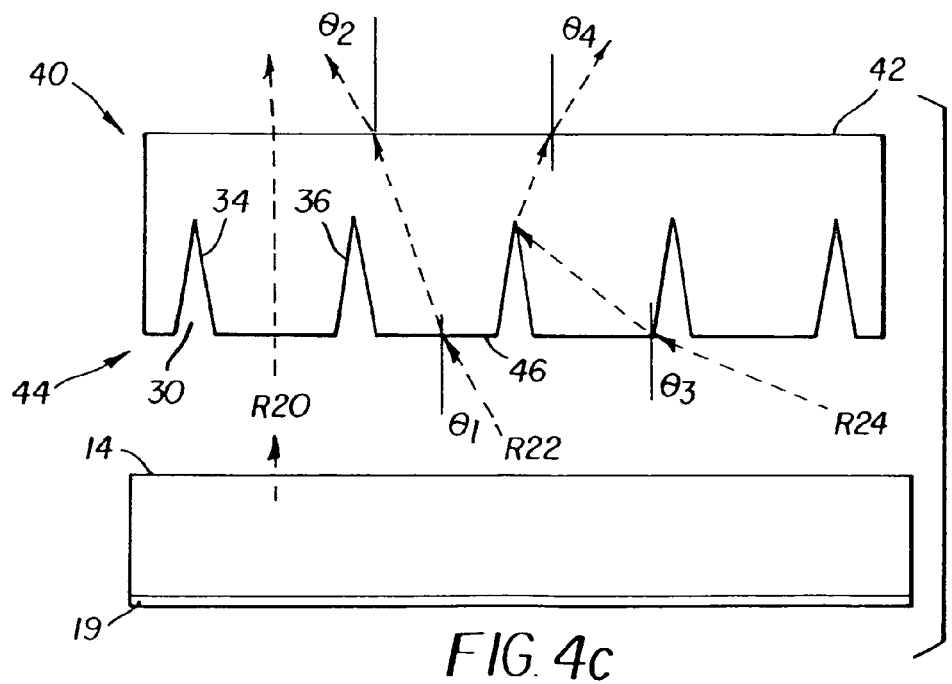

Referring to FIGS. 4a–4h, there are shown cross-sectional views of the novel light-directing structures of a brightness enhancement article 40 of the present invention. In a first embodiment, brightness enhancement article 40 has a smooth side 42 and a prism side 44 having longitudinally arranged trapezoidal prism elements 38. Trapezoidal prism elements 38 can be formed in a number of ways, but can be most clearly defined by considering the spaces between trapezoidal prism elements 38 as a series of parallel grooves 30. By virtue of the groove 30 on each side of trapezoidal prism element 38, each trapezoidal prism element 38 has a pair of mutually non-parallel planes or sides, or legs 34 and 36 and a face plane 46 that faces light providing surface 14 for collecting light, as shown in FIG. 4c. The light coming out of the light providing surface 14 is more or less Lambertian. (The term "legs" is used, in introductory mathematical texts, for the mutually non-parallel sides of a trapezoid.) Thus, as shown in FIG. 4b, each trapezoidal prism element 38 has its dimensions defined by the angle β of legs 34 and 36 relative to face plane 46 and by the pitch P between grooves 30. A base plane 47 larger than the face plane and disposed away from the incoming light connects the base of the prism elements. These dimensions then determine a height H for each trapezoidal prism element 38 and inner trapezoid base angles α. Nominal dimensions used in one embodiment are the following, for example:

Pitch P: 75 microns
Base angle β: 95 degrees
Inner base angle α: 85 degrees.
Height H: 100 microns
Width W: 57.5 microns For the purposes of the description that follows, the following notation and relationships are particularly useful:

Angle $\beta = 180° - \alpha$
Angle $\gamma = 180° - 2\alpha$
Index of refraction: n. For most substrates of interest, $n \geq 1.3$
For pitch P: (wavelength<<P<<500 μm)

As a first order approximation, confirmed by empirical results, best performance is obtained when base angle β satisfies the following:

90 degrees < base angle β < 120 degrees

The thickness of additional substrate material that supports trapezoidal prism elements 38, labeled as dimension T in FIG. 4b, is not a critical dimension as long as the substrate provides sufficient support for brightness enhancement article 40 in its application. In a typical example, thickness T is about 150 microns. In a case when trapezoidal prism elements 38 are connected by other means, the substrate thickness T can be zero, and the material forming the prism element can be air having a refractive index of 1.

In a preferred embodiment, legs 34 and 36 are reflective. Other embodiments are also described hereinbelow, including embodiments wherein legs 34 and 36 are non-reflective.

Redirection of Light by Brightness Enhancement Article 40, Reflective Legs 34, 36

With the arrangement of trapezoidal prism elements 38 shown in FIGS. 4a–4h, incident light is collected by brightness enhancement article 40 at face plane 46. Rays R20, R22, and R24 in FIG. 4c illustrate how brightness enhancement article 40, when legs 34 and 36 are reflective, redirects incident light at various angles θ with respect to normal:

(i) R20: Because face plane 46 presents a flat surface for light that is normally incident, this light is transmitted directly through brightness enhancement article 40.

(ii) R22: For off-axis light that does not strike leg 34 or 36, the angle of the output light is the same as the angle of the incident light, that is:

$\theta_2 = \theta_1$ (iii) R24: For light that strikes reflective leg 34 or 36, the angle of output light is reduced, that is:

$\theta_4 < \theta_3$

Figure 4D:
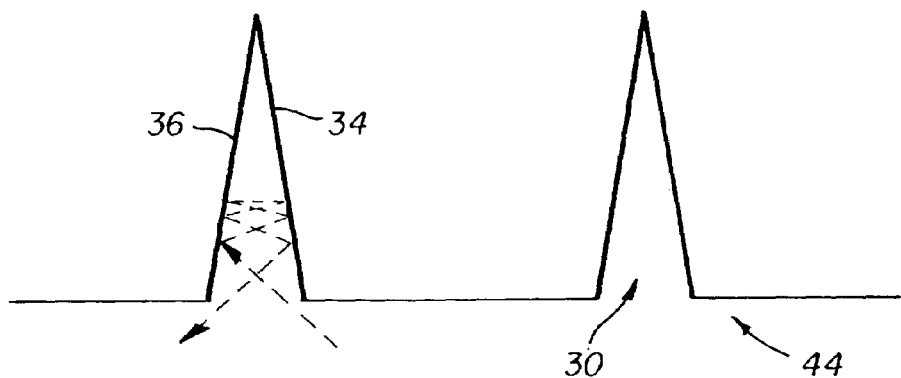
Figure 4E:
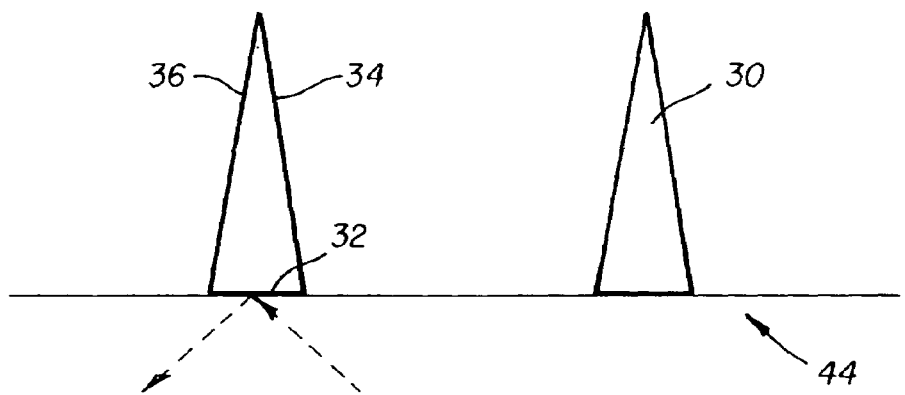

FIGS. 4d–4e show, in enlarged views, the handling of light incident at groove 30 when legs 34 and 36 are reflective. In the case of FIG. 4d, groove 30 is hollow; with FIG. 4e, groove 30 contains a reflective material 32 that provides an additional surface structure for reflecting incident light. In both cases, incident light to this area is reflected back from prism side 44 to light providing surface 14 (not shown in the enlarged views of FIGS. 4d–4h) for recirculation.

Controlling Cutoff Angle θcutoff

Figure 4F:
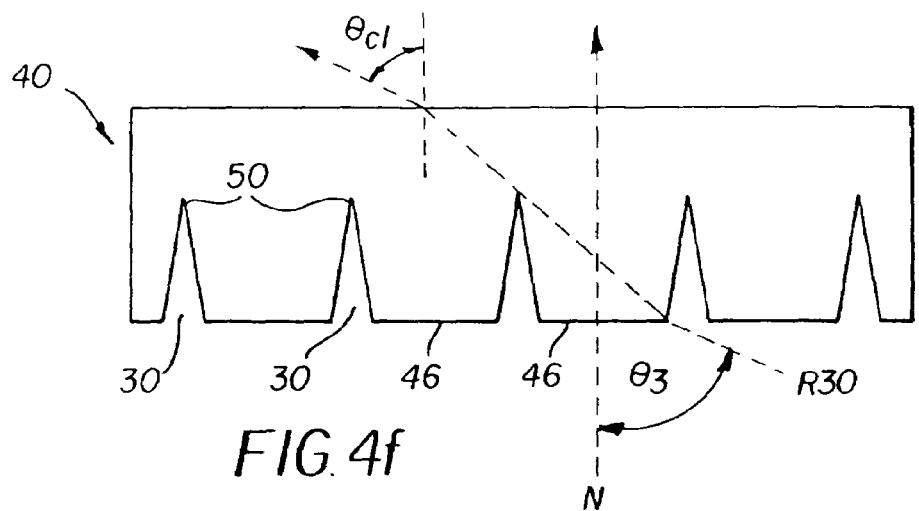
Figure 4G:
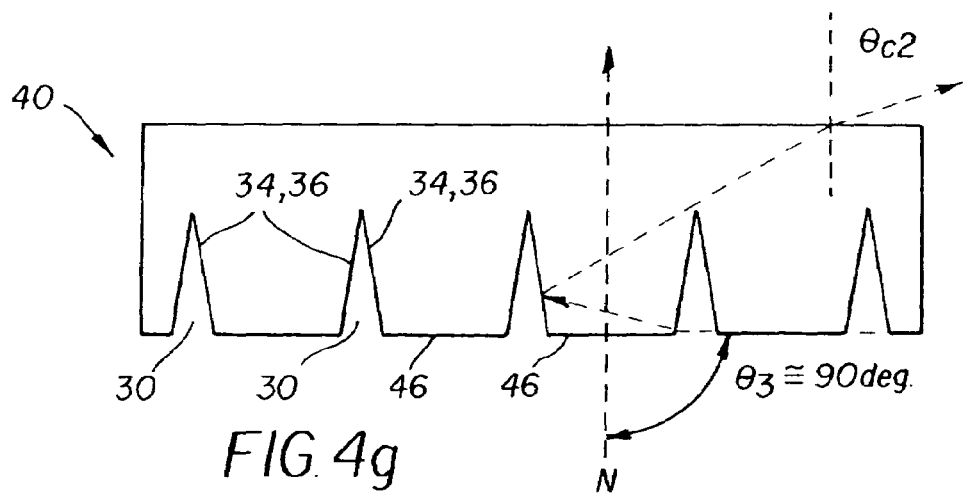
Figure 4H:
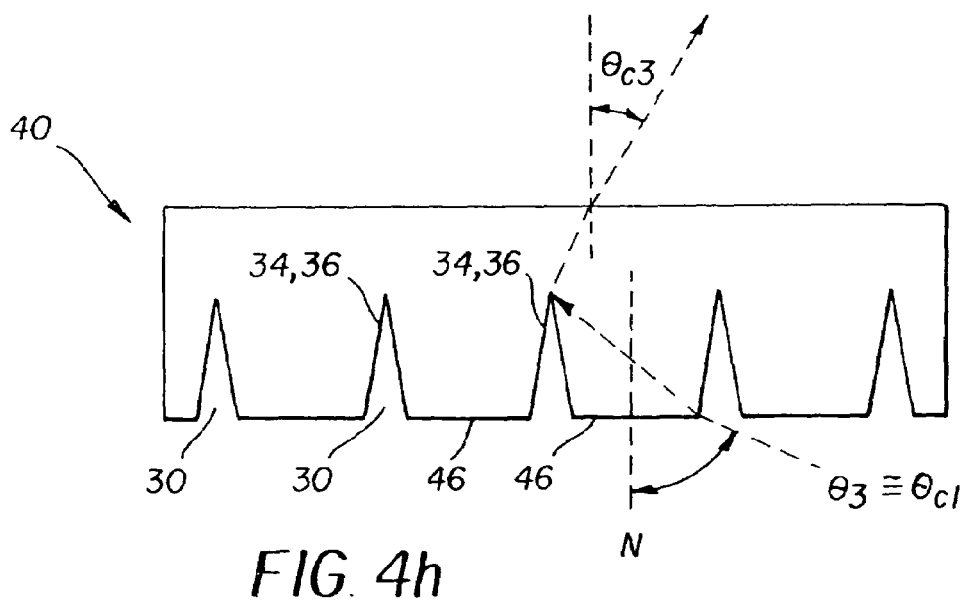

Brightness enhancement article 40 of the present invention is advantaged in providing a method for determining cutoff angle θcutoff and in allowing adjustment of this angle by changing specific dimensions. As is suggested in FIG. 4c, incident light that is at a normal, represented by ray R20, is not refracted or otherwise conditioned. Light at some other angle may or may not impinge upon reflected legs 34, 36 as represented by rays R24 and R22 respectively. Analyzing these possible light paths yields three primary components of cutoff angle θcutoff, shown in FIGS. 4f, 4g, and 4h, namely:

(i) incident light that does not strike leg 34 or 36, generally represented by the path of ray R30 in FIG. 4f, having a first component cutoff angle θc1. Note that light at any incident angle greater than θc1 must strike leg 34 or 36 one or more times;

(ii) incident light at an extreme angle of 90 degrees to normal, as shown in FIG. 4g. This light strikes at least one leg 34, 36 before exiting at a maximum possible second component cutoff angle θc2. FIG. 4g shows the simplest possible case, where the incident light strikes only one leg 34, 36 before exiting. It can be observed that each time the light strikes a leg 34, 36, the angle of the light improves, being reduced with respect to normal. Thus, the representation of component cutoff angle θc2 in FIG. 4g shows the most extreme case for this component; and, (iii) incident light at the other end of the range, bounded by the equivalent of angle θc1. This behavior is represented in FIG. 4h. Since θc1 is the greatest possible angle for light to avoid striking leg 34 or 36, incident light very near the angle θc1, that is, mathematically bounded by the value of θc1 as an upper limit, provides a third component cutoff angle θc3.

The overall cutoff angle θcutoff for brightness enhancement article 40, then, is the maximum absolute value of these three component cutoff angles; that is:

θcutoff = max{|θc1|, |θc2|, |θc3|}

The absolute value is used because the orientation of light with respect to normal is most important; the specific direction of a light ray to either side (left or right) of a normal reference does not need to be considered.

Referring again to FIG. 4f, there is shown how ray R30, extended from the corner of face plane 46 to a vertex 50 of groove 30 defines the first component cutoff angle θc1. That is, ray R30 represents the maximum incident angle for light passing through brightness enhancement article 40 without encountering legs 34, 36. Rays incident at angles larger than ray R30 are reflected from the sides of legs 34, 36. Rays incident at angles smaller than that of R30 can be simply refracted and directed through brightness enhancement article 40, depending on the location at which these rays impinge on face plane 46. Of course, light at the angle of ray R30, but incident elsewhere on the surface of face plane 46, can strike legs 34, 36, as is shown by ray R24 in FIG. 4c. Ray R30 in FIG. 4f simply shows the maximum angular incidence for a ray not reflected internally. As is emphasized hereinabove, light striking leg 34 or 36 is shifted toward normal, so that more complex paths than those shown in FIGS. 4f–4h need not be considered with respect to determining the value of cutoff angle θcutoff.

From the above analysis, the value of first component cutoff angle θc1 can be derived as in equation (1):

$$\theta c1 = \sin^{-1}\left(n \sin\left(\tan^{-1}\left(\frac{P}{H} - \frac{1}{\tan(\alpha)}\right)\right)\right) \quad (1)$$

As is noted above, rays that strike a single leg 34 or 36 are redirected at output angles closer to normal. However, depending on their incident angle, rays might be reflected from legs 34 and 36 multiple times. As is noted above, however, incident light that impinges upon legs 34 or 36 multiple times generally has, when exiting, a reduced angle relative to a normal to smooth side 42.

Given a desired value of θc1, a suitable ratio of height H to pitch P for trapezoidal prism element 38 and dimensions of inner base angle α can then be computed using equation (1).

For brightness enhancement article 40 of the present invention, the three conditions given in equations (2.1), (2.2), and (2.3) relate first component cutoff angle θc1, angle α, and index of refraction n to a range of H/P values.

$$\frac{1}{\tan\left(\sin^{-1}\left(\frac{1}{n}\sin(\theta_{c1})\right)\right) + \frac{1}{\tan(\alpha)}} \leq \frac{H}{P} \quad (2.1)$$

$$\alpha > 90^0 - \sin^{-1}\left(\frac{1}{n}\sin(\theta_{c1})\right) \quad (2.2)$$

$$\frac{H}{P} \leq \frac{1}{\frac{1}{\tan\left(270^0 - 2\alpha - \sin^{-1}\left(\frac{1}{n}\right)\right)} + \frac{1}{\tan(\alpha)}} \quad (2.3)$$

When equations (2.1) and (2.2) are met, all incident light within the range:

$$\theta c1 \leq \text{incident angle} \leq 90 \text{ degrees}$$

strikes one leg 34 or 36. When equation (2.3) is met, light reflected from one leg 34 or 36 will exit without striking a second leg 34 or 36. Equation (2.1) defines a lower limit condition that must be met by ratio H/P in all cases, given values for angle α, θc1, and index of refraction n. Equation (2.3) defines a preferred upper limit where a large off-axis angle is preferred. When it is desirable to have light redirected toward normal, a higher H/P ratio not satisfying equation 2.3 may be preferred.

Referring back to ray R24 in FIG. 4c and to the behavior shown in FIGS. 4g–4h, computation of both θc2 and θc3 is derived by considering the output angle θ4. Equation (2.4) provides a general computation for the value of this output angle:

$$\theta 4 = \sin^{-1}\left(n \sin\left(\sin^{-1}\left(\frac{\sin\theta 3}{n}\right) + 2\alpha - 280\right)\right) \quad (2.4)$$

Observe that angle θ3 is within the range expressed in equation (2.5)

$$\theta c1 \leq \theta 3 \leq 90 \text{ degrees} \quad (2.5)$$

Using equation (2.4), computation of θc2 is performed by setting the value of θ3 to 90 degrees, as expressed in equation (3.1):

$$\theta c2 = \sin^{-1}\left(n \sin\left(\sin^{-1}\left(\frac{1}{n}\right) + 2\alpha - 180^0\right)\right) \quad (3.1)$$

Again using equation (2.4), the value of θc3 can be computed by setting the value of θ3 to the other extreme end of its range, as expressed in equation (3.2a) or (3.2b):

$$\theta c3 = \sin^{-1}\left(n \sin\left(\sin^{-1}\left(\frac{\sin\theta c1}{n}\right) + 2\alpha - 180\right)\right) \quad (3.2a)$$

or $$\theta c3 = \sin^{-1}\left(n \sin\left(\tan^{-1}\left(\frac{P}{H} - \frac{1}{\tan(\alpha)}\right) + 2\alpha - 180\right)\right) \quad (3.2b)$$

Aperture Ratio

Aperture ratio, that portion of the surface that transmits incident light and determines the fill factor, is determined for brightness enhancement article 40 as follows:

$$\text{Aperture} = \frac{W}{P} = 1 - \frac{2}{\tan(\alpha)}\frac{H}{P} \quad (4)$$

As a general principle, a relatively large aperture ratio is most advantageous for achieving maximum luminance. For any particular design using the methods of the present invention, it is necessary to consider the effective aperture ratio as an important design criterion, balanced against considerations of cutoff angle θcutoff.

Because aperture must be greater than zero, $$\text{Aperture} = \frac{W}{P} = 1 - \frac{2}{\tan(\alpha)}\frac{H}{P} > 0, \quad (5)$$

it follows that $$\frac{H}{P} < \frac{\tan(\alpha)}{2}, \text{ or } \alpha > \tan^{-1}\left(\frac{2H}{P}\right) \quad (6.1)$$

It can be observed that conditions (2.2) and (6) are equivalent.

Examples Showing Cutoff Angle Components

Referring to FIGS. 9a–9f, absolute values of cutoff angle components θc1, θc2, and θc3 are plotted against base angle α with selected H/P ratios. In each of these graphs, a lower limit 24 is indicated, which can be expressed as follows:

$$\alpha = \tan^{-1}\left(\frac{2H}{P}\right) \qquad (6.2)$$

This shows the minimum value for base angle α in order to maintain a positive aperture ratio.

Figure 9A:
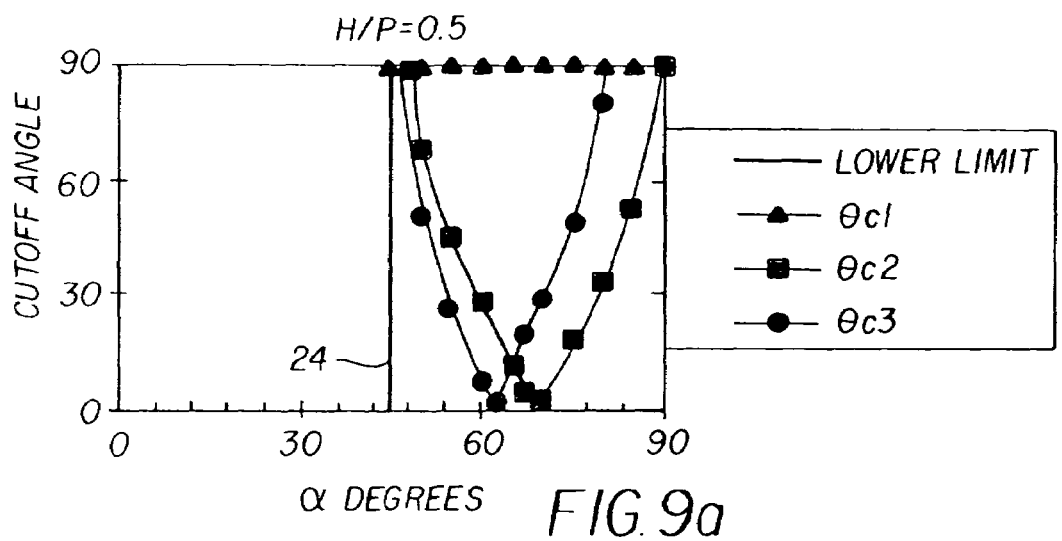
FIGS. 9a–9f are graphs that show cutoff angle components for various dimensional configurations of light-conditioning structures on the brightness enhancement article of the present invention.

In FIG. 9a, ratio H/P=0.5. Here, component θc1 is an imaginary number for a base angle α greater than the lower limit, which indicates that the maximum θc1 can be 90 degrees. Thus, θcutoff=max{|θc1|, |θc2|, |θc3|}=90 degrees.

Figure 9B:
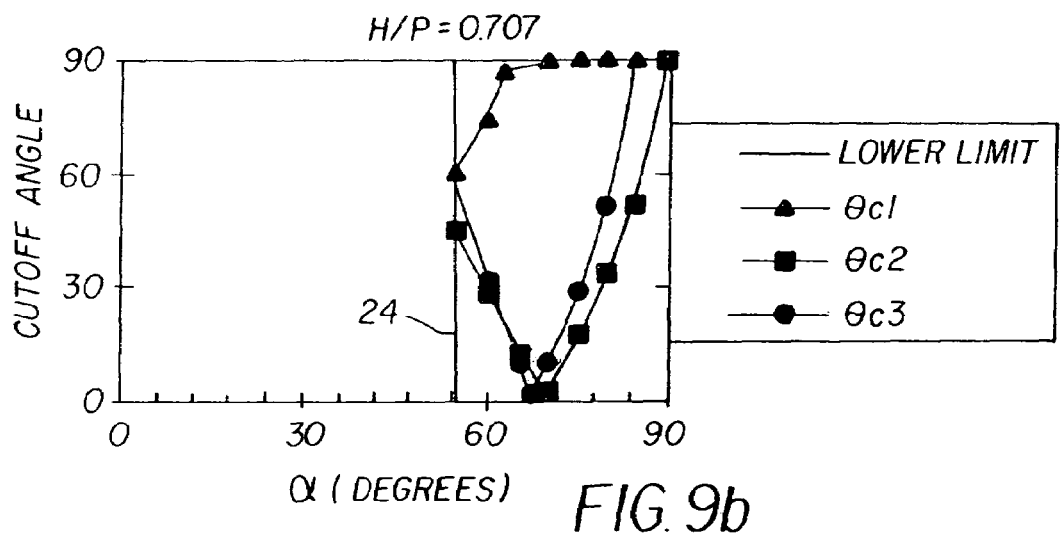

In FIG. 9b, ratio H/P=0.707. Here, component θc1 can vary between 60 and 90 degrees. Thus, in general, θcutoff=max{|θc1|, |θc2|, |θc3|}=|θc1|.

Figure 9C:
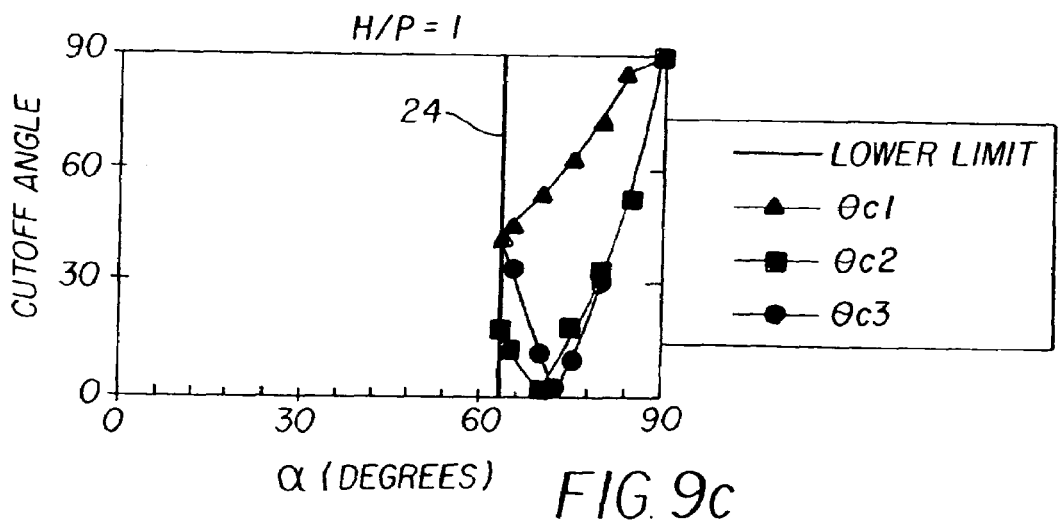

In FIG. 9c, ratio H/P=1.0. Here, component θc1 can vary between 42 and 90 degrees. In general, θcutoff=max{|θc1|, |θc2|, |θc3|}=|θc1|. When base angle α is 70 degrees, θcutoff=|θc1|=54 degrees.

Figure 9D:
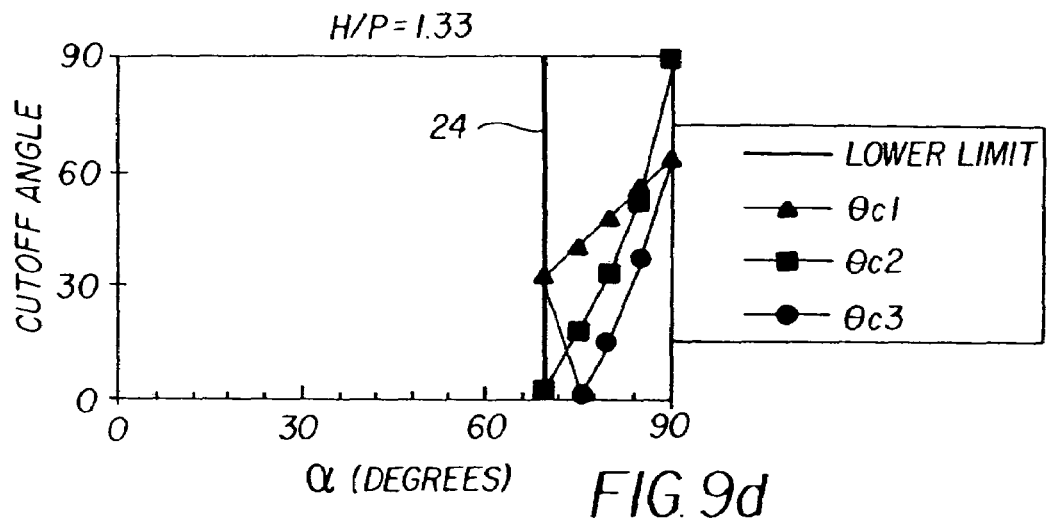

In FIG. 9d, ratio H/P=1.33. When base angle α is bounded such that: 70 degrees<α<85 degrees, then θcutoff=max{|θc1|, |θc2|, |θc3|}=|θc1|. Because component θc1 varies between 33 and 55 degrees, θcutoff also varies. When base angle α>85 degrees, θcutoff=max{|θc1|, |θc2|, |θc3|}=|θc2|, which varies from 55 to 90 degrees. At base angle α=85 degrees, all of the three components θc1, θc2, θc3 are large and close to each other, indicating that more light is redirected toward a large off-axis angle. While base angle α=75 degrees, |θc1|=41 degrees, |θc2|=18 degrees, and |θc3|=6.4 degrees. This prismatic structure redirects more light toward normal.

Figure 9E:
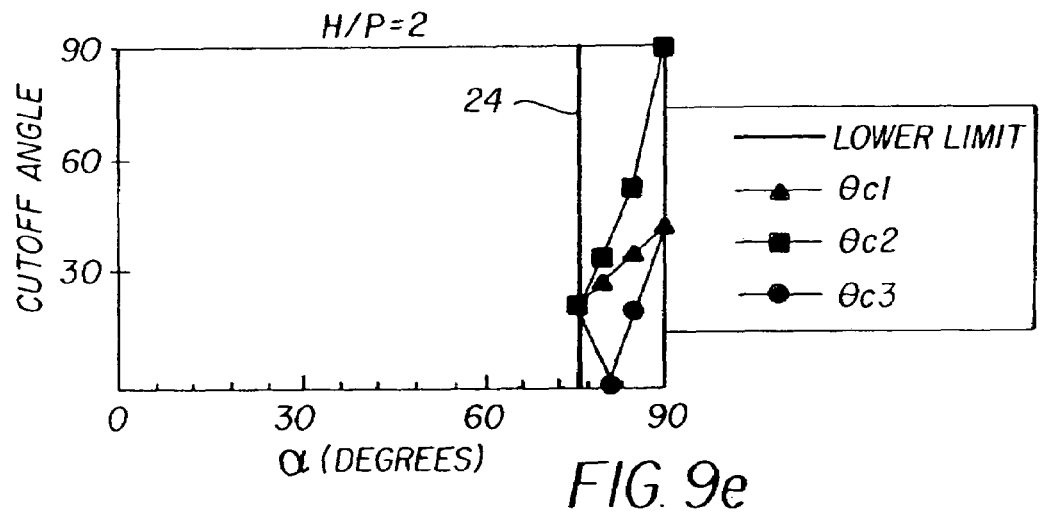

In FIG. 9e, ratio H/P=2.0. Here, the range of base angle α is narrow, α>76 degrees. Here, θcutoff=max{|θc1|, |θc2|, |θc3|}=|θc2| which varies from 21 to 90 degrees. When base angle α=85 degrees, θcutoff=|θc2|=52 degrees.

Figure 9F:
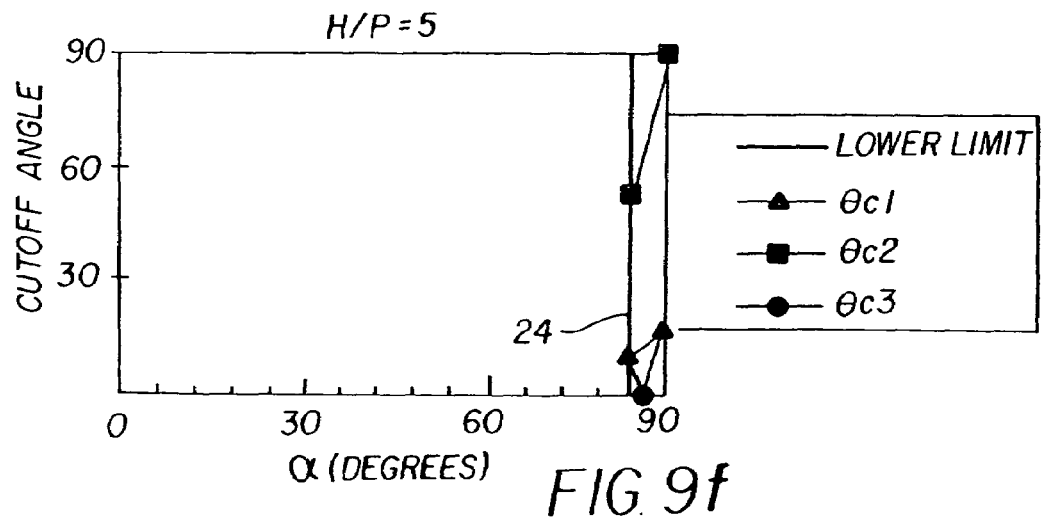

In FIG. 9f, ratio H/P=5.0. Here, the range of base angle α is narrow, α>85 degrees. Here, θcutoff=max{|θc1|, |θc2|, |θc3|}=|θc2| which varies from 21 to 90 degrees.

The following typical parameters provide an example:
  n=1.5
  α=85 degrees
  P=75 microns
  H=100 microns The three cutoff angle components are:
  θc1=55.9 degrees
  θc2=52.2 degrees
  θc3=36.7 degrees Thus, for this example,
  θcutoff=max{|θc1|, |θc2|, |θc3|}=55.9 degrees.

For this cutoff angle, the conditions of equations (2.1) and (2.3) are met, such that:

1.33≦H/P≦1.41

Figure 8:
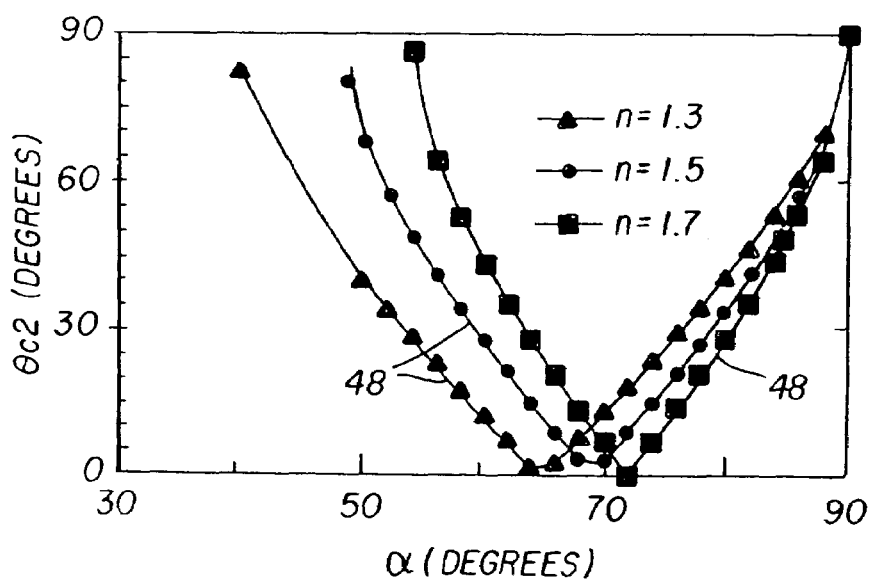
FIG. 8 is a graph showing the relationship of a component of the cutoff angle to a base angle of the trapezoidal structure used in the present invention.

The relationship of the second component cutoff angle θc2 to inner base angle α, for various typical indices of refraction n, is shown in the graph of FIG. 8.

It must be emphasized that the computational derivation of cutoff angle θcutoff is approximate. There is still a small portion of stray light that does not conform to the various light paths described with reference to cutoff angle components θc1, θc2, and θc3. However, this small amount of stray light can be considered as "noise" for the purpose of determining a practical cutoff angle θcutoff.

Selection of Suitable Parameters

The apparatus and method of the present invention allow the design of brightness enhancement article 40 having cutoff angle behavior that is best suited to the requirements of a display application. Dimensional data about brightness enhancement article 40 can be used to predict its overall response in a display application.

Figure 1:
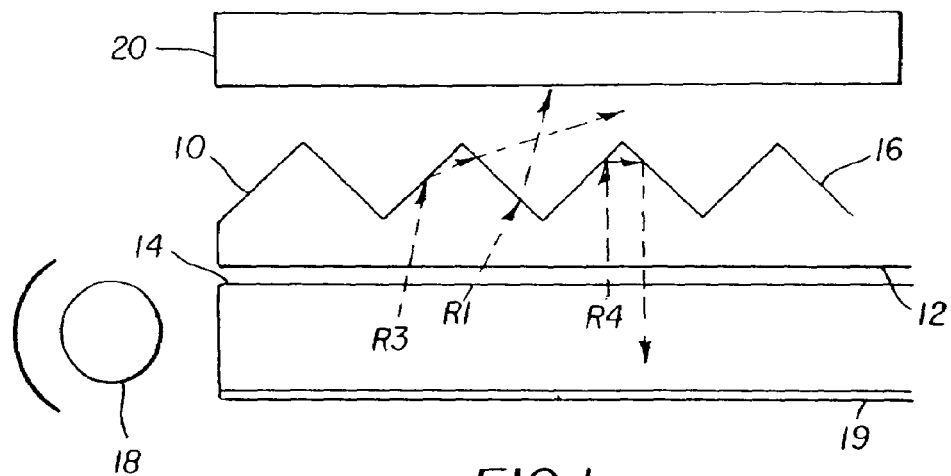
FIG. 1 is a cross-sectional side view showing a prior art brightness enhancement article used with an LCD display.

It is significant to note that, as shown in FIGS. 9a–9f, the minimum base angle α provides prismatic structures 16 that are essentially triangular in shape, rather than trapezoidal. Thus, the method of the present invention could be employed to determine cutoff angle behavior of prior art brightness enhancement articles 10 as shown in FIG. 1 in a general case, as well as to assess how a change in base angle α impacts the behavior of brightness enhancement article 40 of the present invention, as is shown in FIGS. 4a–4h.

Redirection of Light by Brightness Enhancement Article 40, Non-Reflective Legs 34, 36

In an alternate embodiment, one or more of legs 34, 36 is non-reflective. This arrangement makes it more difficult to determine the value of θcutoff. However, a similar overall approach can be applied, with a first component based on light at smaller incident angles that does not strike leg 34, 36 and a second component that impinges on leg 34, 36.

Figure 12:
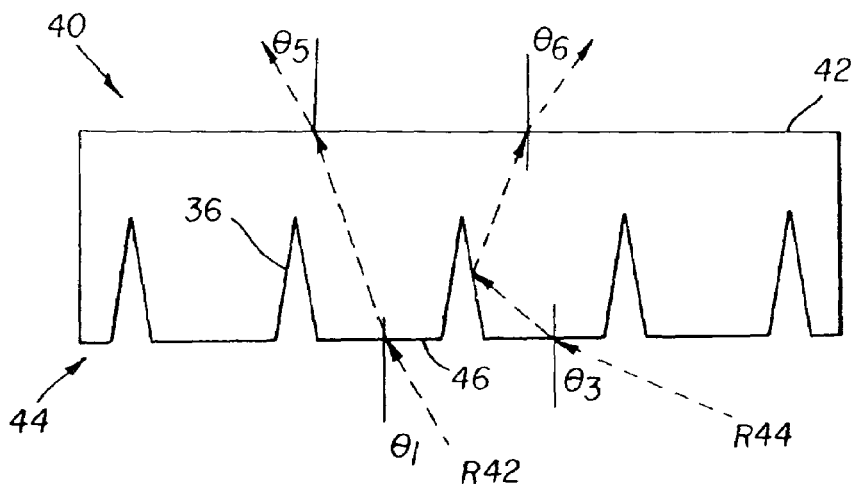
FIG. 12 is a cross-sectional side view showing total internal reflection for an embodiment using non-reflective surfaces.

Referring to FIG. 12, there are shown light-handling characteristics for brightness enhancement article 40 where legs 34, 36 are non-reflective. As with the embodiment of FIGS. 4a–4h, incident light at a small angle is transmitted at the same angle, as shown by ray R42, where θ1=θ5. Incident light at face plane 46 that is directed toward leg 34, 36 may also be redirected to provide a smaller angle, by means of total internal reflection (TIR), as is shown by ray R44.

For this embodiment, total internal reflection occurs as long as the following relationship applies:

$$180^\circ - 2\sin^{-1}\left(\frac{1}{n}\right) > \alpha \qquad (7)$$

Note that for α≦90°, as long as n≧√2, $$180^\circ - 2\sin^{-1}\left(\frac{1}{n}\right) \geq \alpha$$

is always satisfied. Generally, this is true for most suitable types of transparent film.

To boost light recycling efficiency for groove 30, then, the following is preferred:

$$180^\circ - 2\sin^{-1}\left(\frac{1}{n}\right) \geq \alpha \geq 2\sin^{-1}\left(\frac{1}{n}\right) \qquad (8)$$

Figure 10:
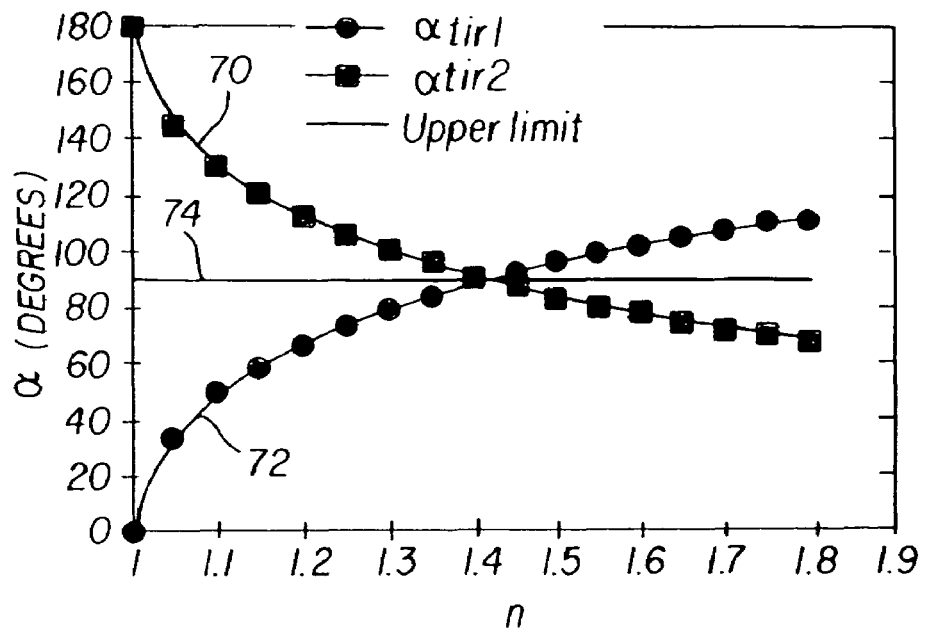
FIG. 10 is a graph that relates a base angle for total internal reflection to an index of refraction for the brightness enhancement article substrate.

Referring to FIG. 10, there is shown the relationship of base angle α to refractive index n. Curves 70 and 72 show the dependence of base angle α on refractive index n for total internal reflection at legs 34, 36 and at smooth surface 42, relative to an upper limit 74 α=90°. Curves 72 and 70 are expressed as follows:

$$\alpha_{tir1} = 180° - 2\sin^{-1}\left(\frac{1}{n}\right) \quad (9.1)$$

and $$\alpha_{tir2} = 2\sin^{-1}\left(\frac{1}{n}\right), \quad (9.2)$$

respectively.

Figure 13:
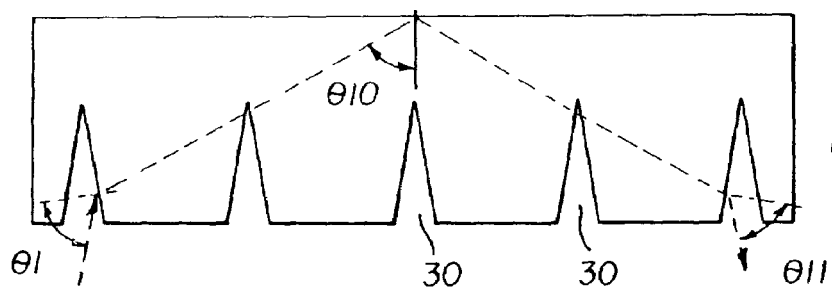
FIG. 13 is a cross-sectional side view showing total internal reflection for light impinging on the upper surface of a brightness enhancement article in an alternate embodiment.

Returning to FIG. 12, it was shown how total internal reflection at non-reflective legs 34, 36 redistributes light so that angle θ6 of outgoing light is less than angle θ3 of incident light. Referring to FIG. 13, a secondary total internal reflection effect can occur for light impinging upon grooves 30, transmitted through legs 34, 36, and incident at smooth side 42. Incident light at angle θ1 also is refracted so that θ10 exceeds angle θtir. The incident and reflected light paths exit and enter at one or more grooves 30. This light can then be recycled and pass through the film as ray R44.

Figure 14:
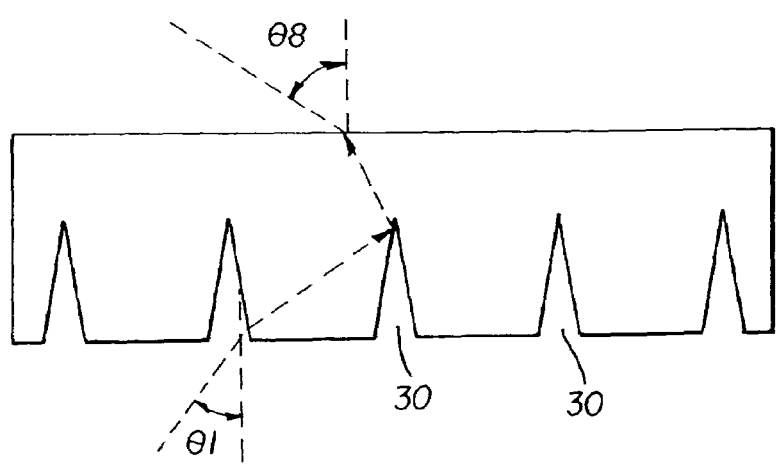
FIG. 14 is a cross-sectional side view showing light behavior in the brightness enhancement article of an alternate embodiment using non-reflective legs.

Referring to FIG. 14, the behavior of light at another possible angle is shown. here, light impinging upon leg 34, 36 is reflected due to total internal reflection and is directed as output light. However, the output light can be at a significant angle θ8 with respect to normal.

In general, the behavior of brightness enhancement article 40 with non-reflective legs 34, 36 is more difficult to characterize than is the reflective leg embodiment. However, it can be appreciated that the non-reflective embodiment offers significant light-conditioning benefits for use with backlit displays.

Note that if air is replaced with a dielectric layer, the refractive index n is understood as the ratio of refractive index of the film over that of the replacing dielectric layer material.

Use in Illumination System

In conventional use with LCD displays, a pair of crossed brightness enhancement articles is employed. Referring to the exploded view of FIG. 5, there is shown how brightness enhancement article 40 of the present invention can be used as part of an illumination system 52 for a display, such as for an LCD laptop display. Illumination from light source 18 is directed by light providing surface 14 to a first sheet of brightness enhancement article 40 having grooves 30 oriented in a first direction D1. A second sheet of brightness enhancement article 40 is overlaid onto this first sheet, where the second sheet has grooves 30 oriented in a second direction D2, orthogonal to direction D1.

Single-Sheet Embodiments

Figure 5:
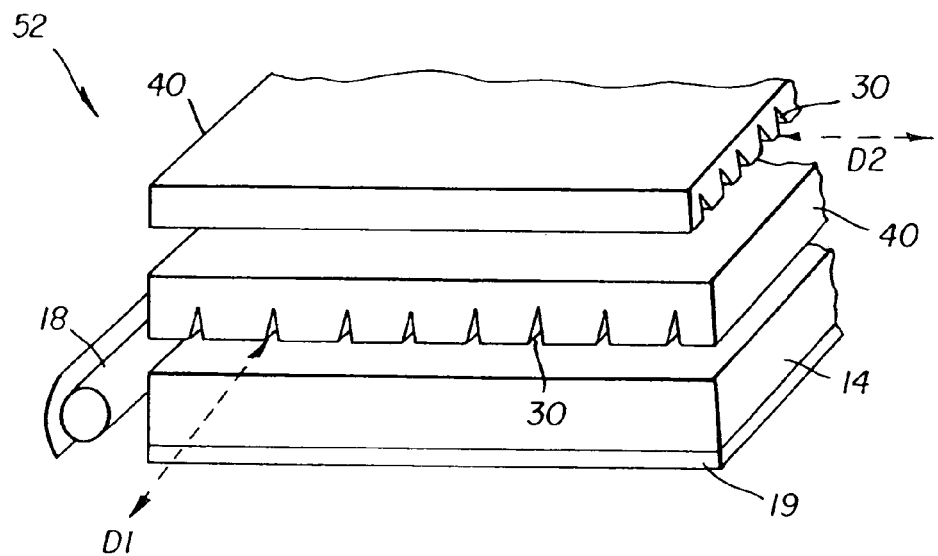
FIG. 5 is a perspective view showing a portion of an LCD display using the brightness enhancement article of the present invention.

It can be appreciated that there would be value in providing brightness enhancement article 40 as a single component capable of enhancing illumination along orthogonal directions. However, whether using either a prior art brightness enhancement article or brightness enhancement articles 40 of the present invention, the individual brightness enhancement articles 40 are required to have prismatic structures facing the same direction, as is shown in FIG. 5. This requirement, well known to those skilled in deploying brightness enhancement devices, prevents the integration of two crossed brightness enhancement articles onto a single film.

Figure 6:
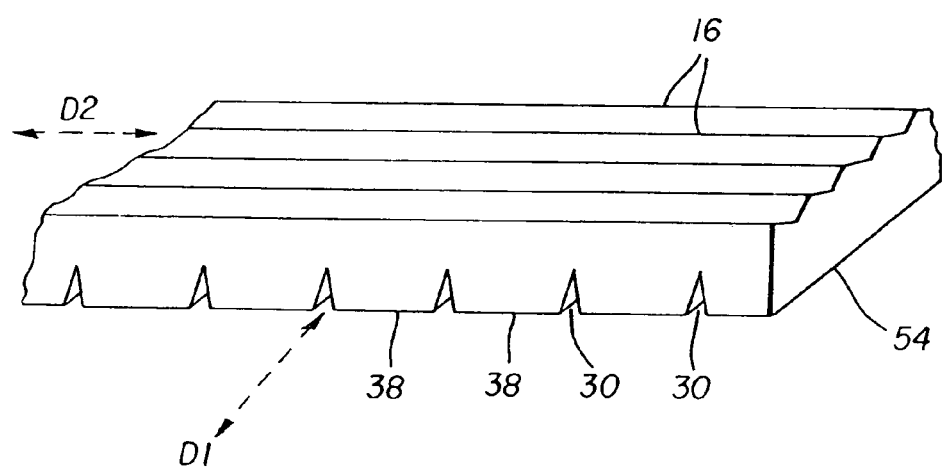
FIG. 6 is a perspective view showing an alternate embodiment of a brightness enhancement article according to the present invention.
Figure 15:
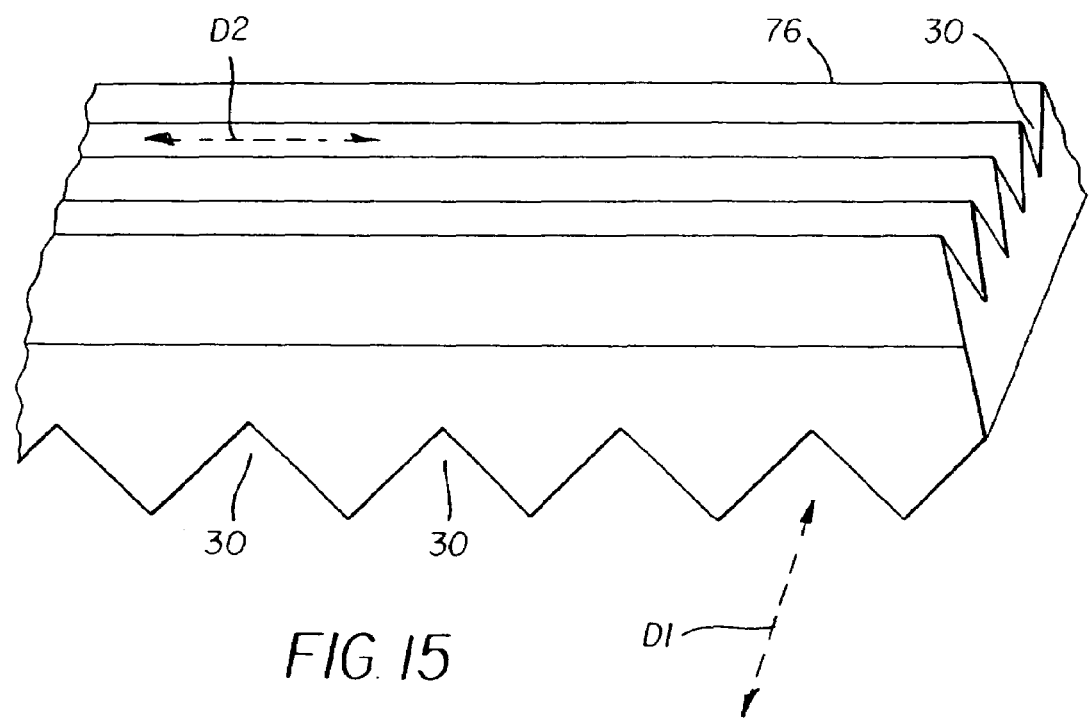
FIG. 15 is a perspective view showing an alternate embodiment of a brightness enhancement article according to the present invention; and, FIG. 16 is a perspective view showing yet another alternate embodiment of a brightness enhancement article according to the present invention.

An arrangement for a single sheet brightness enhancement article 54 that replaces two crossed brightness enhancement articles is shown in FIG. 6. One surface of single-sheet brightness enhancement article 54 comprises trapezoidal prism elements 38, with grooves 30 extending in direction D1. The opposite surface comprises prismatic structures 16 that are similar to those of prior art brightness enhancement articles 10 shown in FIG. 1, with parallel rows that are aligned in orthogonal direction D2. By thus combining orthogonal light directing structures into a single component, single-sheet brightness enhancement article 54 allows a thinner package for illumination system 52 than is available using a conventional arrangement of crossed brightness enhancement articles 10. Referring to FIG. 15, there is shown, in a perspective sectional view, a more generalized alternate embodiment for a single sheet brightness enhancement article 76. In this embodiment, trapezoidal structures may or may not be used. In this generalized depiction, both surfaces of single sheet brightness enhancement article 76 have rows of prism elements of some type and can be considered as having grooves 30 in orthogonal directions D1 and D2 corresponding to each side. For such an embodiment, trapezoidal structures having a very small face plane 46 size could be employed; such structures would also have the overall triangular appearance shown in FIG. 6.

Figure 2:
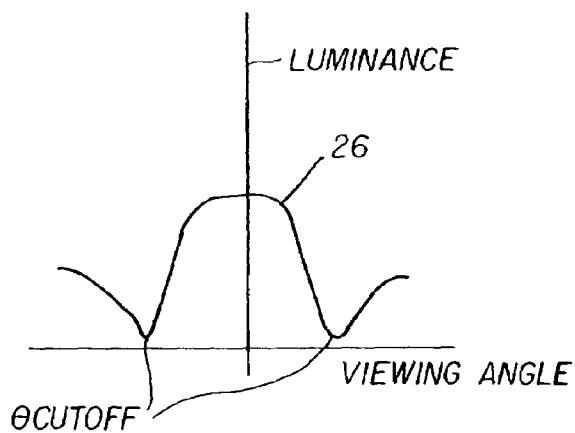
FIG. 2 is a graph showing the relationship of luminance to viewing angle for a prior art brightness enhancement article.
Figure 3:
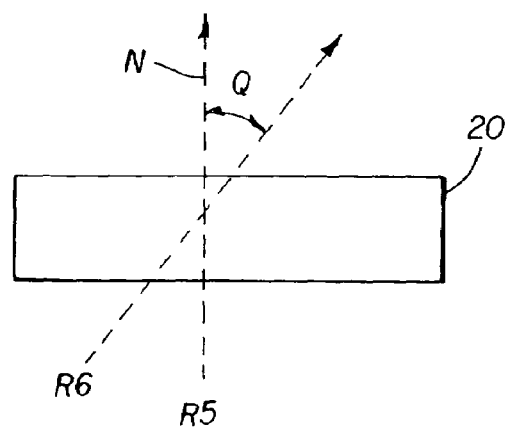
FIG. 3 is a side view representation of normal and oblique illumination and view angles through an LCD display component.
Figure 7:
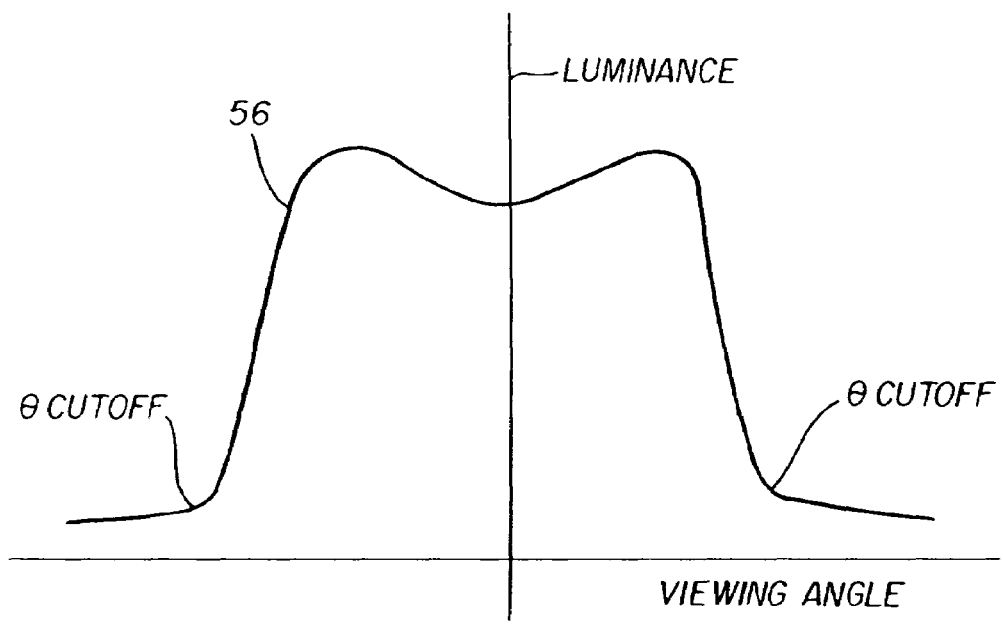
FIG. 7 is a graph showing the comparative relationship of luminance to viewing angle for brightness enhancement article of the present invention.

Brightness enhancement article 40 of the present invention provides favorable luminance characteristics relative to viewing angle. Referring to FIG. 7, there is shown luminance curve 56 for brightness enhancement article 40 of the present invention, where the viewing angle varies in the plane perpendicular to grooves 30. As can be appreciated from luminance curve 56 in FIG. 7, the luminance enhancement solution of the present invention provides the advantages of redistributed light at off-axis angles and controllable cutoff angle θc. In addition, brightness enhancement article 40 provides a brightness response that minimizes the wasted light that results in slight peaking at off-axis angles beyond cutoff angle θc, as was shown in FIG. 2. It must be noted, however, that with properly chosen prism parameters, the brightness peak can be tuned to maximize on-axis luminance, effectively redirecting the peak energy toward the optical axis.

Figure 11:
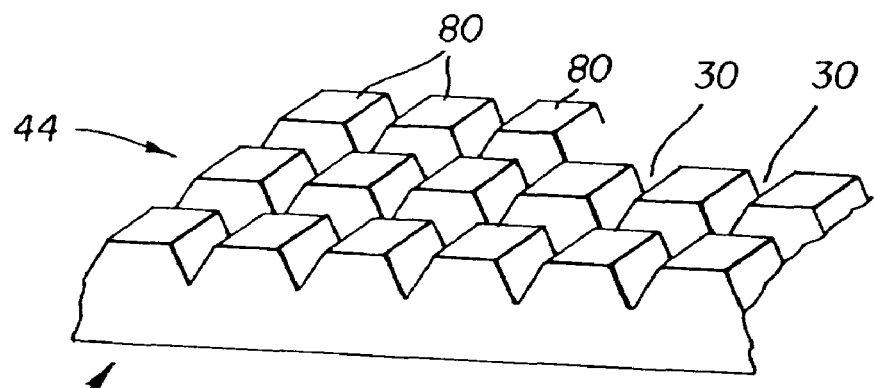
FIG. 11 is a perspective view showing the featured surface of a brightness enhancement article in an alternate embodiment.

The preferred embodiment described hereinabove employs trapezoidal elements arranged longitudinally along prism side 44 of brightness enhancement article 40. Referring to FIG. 11, there is shown, from a prism side 44 perspective view, another alternate embodiment in which prism elements 80 are provided. In the embodiment of FIG. 11, grooves 30 extend in mutually orthogonal directions across the surface of prism side 44, thereby defining a matrix arrangement of prism elements 80, having the appearance of rows of truncated pyramids. With this alternate arrangement, brightness enhancement article 40 directs light toward normal with respect to each of two orthogonal directions. In this way, a single sheet of brightness enhancement article 40 can be used for redirecting light toward a display surface.

Figure 16:
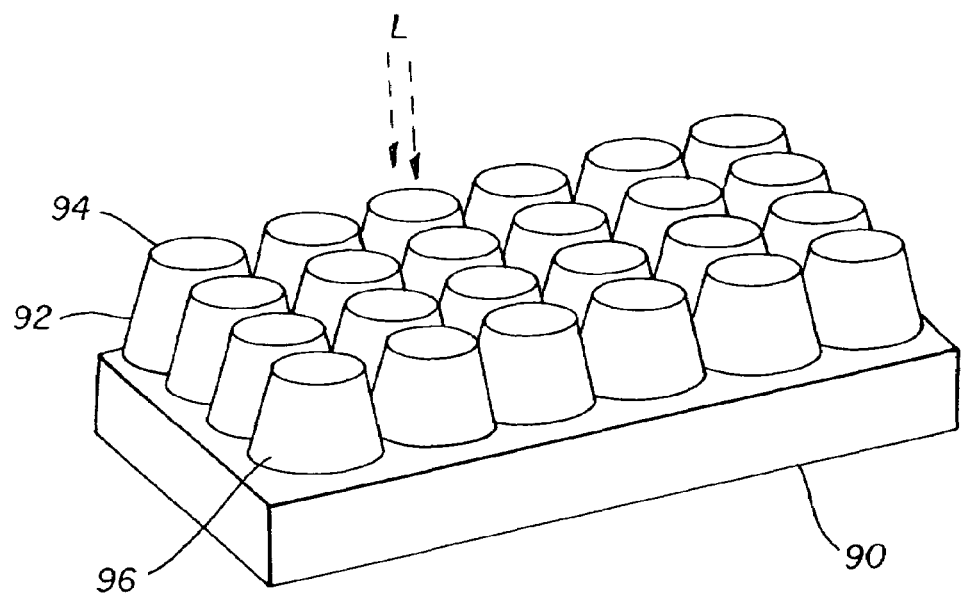

Prism elements 80 in the brightness enhancement article 40 arrangement of FIG. 11 are cross-sectionally V-shaped trapezoidal in orthogonal directions, providing improved luminance characteristics with a single sheet. Referring to FIG. 16, prism elements 92 on an alternate brightness enhancement article 90 have the overall shape of inverted, truncated cones, that is, each prism element 92 has the shape of a conical frustum. With respect to any direction within the plane of alternate brightness enhancement article 90, however, prism elements 92 are cross-sectionally trapezoidal. Each prism element 92 has a face plane 94 for accepting incident light L. For each prism element 92, a side 96 may be either reflectively coated or may be essentially non-reflective. A reflective filling material can also be applied between prism elements 92. It can be appreciated that the arrangement of FIG. 16 would have inherent advantages over the arrangement of FIG. 11, since light from any direction within the plane is angularly redirected in the same manner. It is significant to note that considerations of cutoff angle θcutoff calculation and overall luminance curve 26 shape are similar to those described hereinabove for embodiments having trapezoidal prism elements in only a single direction. For example, using the arrangement of FIG. 16, cutoff angle θcutoff could be computed for incident light at any angle relative to the trapezoidal structure. Similar analysis applies for determining base angles α and β as are used for the linear embodiment described with respect to FIGS. 4a–4h.

The invention has been described with reference to a preferred embodiment; However, it will be appreciated that variations and modifications can be effected by a person of ordinary skill in the art without departing from the scope of the invention. For example, various types of coatings could be applied to the transparent substrate in order to obtain suitable reflective properties for legs 34 and 36. Various types of substrate could be employed, selected based on properties such as index of refraction, resilience to heat, or other characteristics. Examples of possible substrates include acrylic and polyethylene sheets. While the figures and description of this disclosure describe trapezoidal structures, related embodiments can include structures that are more generally trapezoidal in outline, but may have slight curvature along face plane 46 or legs 34 and 36 or rounding at corners. Pitch P between grooves 30 can be varied as needed, even allowing different values of pitch P on the same sheet of substrate. Depending on the shape of the prism elements needed, various fabrication methods could be used for forming brightness enhancement article 10, including molding or etching, for example. Various types of surface treatment could be applied to face plane 46, to legs 34, 36, or to smooth side 42.

The brightness enhancement article of the present invention is suitable for use with LCD display devices as well as with emissive display devices such as Organic LEDs (OLEDs) which do not require a separate light source.

Thus, what is provided is an improved brightness enhancement article for use with transmissive LCD displays and other types of backlit display applications.

PARTS LIST

10. Brightness enhancement article
12. Smooth side
14. Light providing surface
16. Prismatic structures
18. Light source
19. Reflective surface
20. LCD component
24. Lower limit
26. Luminance curves
30. Groove
32. Reflective material
34, 36. Base leg
38. Trapezoidal prism element
40. Brightness enhancement article
42. Smooth side
44. Prism side
46. Face plane
47. Base plane
48. Curves
50. Vertex
52. Illumination system
54. Single-sheet brightness enhancement article
56. Luminance curve
60. Lower limit curve
62. Upper limit curve
64. Limit line
70, 72. Curves
74. Limit
76. Single sheet brightness enhancement article
80. Prism elements
90. Alternate brightness enhancement article
92. Prism element
94. Base
96. Side

What is claimed is:

1. A brightness enhancement article for transmitting incoming light and preferentially redirecting the light in a viewing direction, comprising a prism surface for receiving the light comprising a series of spaced-apart prism elements having a substantially trapezoidal cross-section, each said trapezoidal prism element comprising:
   (a) a face plane disposed toward the incoming light;
   (b) a base plane larger than the face plane, disposed away from the incoming light, connecting the base of the prism elements; and
   (c) first and second non-parallel planes extending back from said face plane to said base plane, each forming an angle (β), within the prism element between the non-parallel plane and said face plane, of greater than 90 and less than 120 degrees;
   wherein the ratio of height (H) or orthogonal distance between the face plane and the base plane to the pitch (P) or distance between identical points in adjacent prism for said article, provides a cutoff angle for output light as the largest of the absolute values θc1, θc2, and θc3 defined as follows:

$$(i) \quad \theta c1 = \sin^{-1}\left(n\sin\left(\tan^{-1}\left(\frac{P}{H} - \frac{1}{\tan(\alpha)}\right)\right)\right)$$

$$(ii) \quad \theta c2 = \sin^{-1}\left(n\sin\left(\sin^{-1}\left(\frac{1}{n}\right) + 2\alpha - 180^\circ\right)\right)$$

$$(iii) \quad \theta c3 = \sin^{-1}\left(n\sin\left(\sin^{-1}\left(\frac{\sin\theta c1}{n}\right) + 2\alpha - 180^\circ\right)\right)$$

wherein α=180°−β degrees and wherein n is the index of refraction of the prism element material.

2. An article of claim 1 wherein the prism elements are formed by elongated V-shaped grooves.

3. An article according to claim 1 said article being made of a transparent polymer derived from an ethylene or acrylic monomer.

4. An article according to claim 1 wherein said prism elements are spaced apart at substantially equal intervals.

5. An article according to claim 1 wherein said incoming light is Lambertian.

6. An article according to claim 1 wherein the materials forming prism structures are polymeric.

7. An article according to claim 1 wherein the pitch (P) or distance between identical points in adjacent prisms is from 10 to 200 microns.

8. An article according to claim 1 wherein the pitch (P) is from 10 to 100 microns.

9. An article according to claim 1 wherein the ratio of the height (H) or orthogonal distance between the face plane and the base plane to the pitch (P) is from 0.5 to 5.

10. An article according to claim 1 wherein the ratio of the height (H) or orthogonal distance between the face plane and the base plane to the pitch (P) is from 1 to 2.

11. An article according to claim 1 wherein the prismatic surface comprises two series of V-shaped grooves in directions orthogonal to each other.

12. An article according to claim 1 wherein the prism elements are truncated cone shaped.

13. An article according to claim 1 wherein the prism elements are truncated pyramid shaped.

14. A liquid crystal display device comprising an article of claim 1.

15. An article according to claim 1 further comprising a second prismatic surface comprising a series of spaced apart prism elements on the viewing side of the article wherein the prism elements are arranged in a first direction orthogonal to the prism elements on the light receiving surface.

16. An article according to claim 15 wherein said viewing side prismatic surface comprises a linear array of substantially triangular prism-shaped lens elements having longitudinal axes in a second direction along said second prismatic surface, said second direction orthogonal to said first direction.

17. A display device comprising the article of claim 1 and a light modulator in the path of transmitted light for forming an image for display.

18. A display device according to claim 17 wherein said light modulator is an LCD spatial light modulator.

19. A liquid crystal display device comprising two articles of claim 1 each having a prismatic surface on their respective light receiving surfaces.

20. A liquid crystal display device according to claim 19 wherein the two prismatic surfaces are oriented orthogonal to each other.

21. An article according to claim 1 wherein at least one of said first and second non-parallel planes has a reflective surface.

22. An article according to claim 21 wherein said reflective surface comprises at least one optical coating.

23. An article according to claim 21 wherein said reflective surface comprises a filling within the space between the prism elements.

24. An article according to claim 21 wherein the material forming the prism elements is air.

25. A method for enhancing brightness of incoming light and preferentially redirecting the light in a viewing direction, comprising directing the light through a prism surface for receiving the light comprising a series of spaced-apart prism elements having a substantially trapezoidal cross-section, each said trapezoidal prism element comprising:

(a) a face plane disposed toward the incoming light;

(b) a base plane larger than the face plane, disposed away from the incoming light, connecting the base of the prism elements; and (c) first and second non-parallel planes extending back from said face plane to said base plane, each forming an angle ($\beta$), within the prism element between the non-parallel plane and said face plane, of greater than 90 and less than 120 degrees;

wherein the ratio of height (H) or orthogonal distance between the face plane and the base plane to the pitch (P) or distance between identical points in adjacent prism for said article, provides a cutoff angle for output light as the largest of the absolute values $\theta c1$, $\theta c2$, and $\theta c3$ defined as follows:

(i) $\theta c1 = \sin^{-1}\left(n \sin\left(\tan^{-1}\left(\frac{P}{H} - \frac{1}{\tan(\alpha)}\right)\right)\right)$ (ii) $\theta c2 = \sin^{-1}\left(n \sin\left(\sin^{-1}\left(\frac{1}{n}\right) + 2\alpha - 180^0\right)\right)$ (iii) $\theta c3 = \sin^{-1}\left(n \sin\left(\sin^{-1}\left(\frac{\sin \theta c1}{n}\right) + 2\alpha - 180^0\right)\right)$ wherein $\alpha = 180° - \beta$ degrees and wherein n is the index of refraction of the prism element material.

* * * * *